UNITED STATES PATENT OFFICE.

FRIEDERICH GOETSH AND PETER FEDDE, OF BLOOMINGTON, ILLINOIS.

IMPROVEMENT IN PAVING COMPOSITIONS.

Specification forming part of Letters Patent No. 152,742, dated July 7, 1874; application filed February 9, 1874.

*To all whom it may concern:*

Be it known that we, FRIEDERICH GOETSH and PETER FEDDE, joint inventors, both of Bloomington, in McLean county and State of Illinois, have invented a certain Compound to be used for walks, drives, roads, cellar-bottoms, brewery-floors, &c., of which the following is a specification:

The nature of our invention consists in compounding the following ingredients, as hereinafter set forth, making from the same, when mixed with fine gravel, a very durable walk, drive, foundation for streets, cellar-bottoms, brewery-floors, &c.—a composition not affected by changes of seasons, rain, sun, or frost, and superior for the purposes named to anything within our knowledge.

Our compound consists of linseed-oil, sulphuric acid, or oil of vitriol, coal-tar, white pitch, rosin, sulphur, and fine gravel. We find by experiment that the best results are reached when compounded in about the following proportions, which we prefer to use, though we do not limit ourselves to these exact proportions, viz: About eight parts (each in weight) of linseed-oil, one-quarter of one part of sulphuric acid, or oil of vitriol, eight parts of coal-tar, sixteen parts of white pitch, sixteen parts of rosin, and sixteen parts of sulphur. Melt the same together in a kettle, and stir thoroughly till the ingredients are well mixed and united; then allow the mixture to cool, molded into form, if desired, and keep the same till needed. Then, when about to be used in making walks, road-beds, drives, cellar-bottoms, or brewery-floors, put this mass again into a kettle, and melt the same a second time. This second heating improves the compound, and when melted and well stirred, add fine, well-sifted and well-heated gravel, and mix all well together. We prefer to add about as much gravel as we have of the mixture without the gravel, pound for pound, and when the gravel is well stirred into the liquid mixture, and when the entire mass is hot, so that it can be worked easily, we at once put it where desired, and smooth it into position where wanted for walks, driveways, road-beds, cellar-bottoms, and brewery-floors, as aforesaid.

We do not wish to limit ourselves to any exact amount of gravel in the mixture aforesaid; the quantity used can be at the discretion of the maker of compound; but we prefer to use about one pound of gravel to one pound of liquid, as aforesaid, or in that proportion.

We claim as our invention—

A compound composed of the ingredients aforesaid, compounded substantially in the proportions and for the purposes set forth.

DR. FRIEDERICH GOETSH.
PETER FEDDE.

Witnesses:
THOS. SLADE,
CHAS. B. SLADE.